United States Patent
Adashek

[19]

[11] Patent Number: 5,962,050
[45] Date of Patent: Oct. 5, 1999

[54] PIZZA-TYPE PRODUCT HAVING AN INCREASED LENGTH OF EXPOSED CRUST EDGE, AND METHOD OF MAKING

[76] Inventor: John D. Adashek, 9470 N. Waverly Dr., Whitefish Bay, Wis. 53217

[21] Appl. No.: 08/877,282

[22] Filed: Jun. 17, 1997

[51] Int. Cl.⁶ .................................................. A21D 13/00
[52] U.S. Cl. .............................. 426/94; 426/76; 426/144; 426/275; 426/496
[58] Field of Search .................... 426/496, 503, 426/94, 76, 144, 143, 275

[56] References Cited

U.S. PATENT DOCUMENTS

| | | |
|---|---|---|
| 2,332,595 | 10/1943 | Paquette . |
| 2,478,571 | 8/1949 | Creider . |
| 2,499,309 | 2/1950 | Harris . |
| 2,779,097 | 1/1957 | Frazier . |
| 3,531,863 | 10/1970 | Sandborn et al. . |
| 3,864,071 | 2/1975 | La Monica . |
| 4,251,554 | 2/1981 | Baisden ..................................... 426/128 |
| 5,074,778 | 12/1991 | Betts, Jr. et al. . |
| 5,417,150 | 5/1995 | Kordic . |
| 5,508,049 | 4/1996 | Kordic . |
| 5,514,402 | 5/1996 | Williams ................................... 426/496 |
| 5,830,519 | 11/1998 | Telfer et al. .............................. 426/144 |

*Primary Examiner*—Lien Tran
*Attorney, Agent, or Firm*—Andrus, Sceales, Starke & Sawall

[57] ABSTRACT

A compound pizza arrangement includes an inner shell section and an outer shell section. A gap is formed between the outer edge of the inner shell section and an inner edge of the outer shell section, to prevent the shell sections from contacting each other when the shell sections expand during baking. The inner and outer shell sections function to increase the overall length of the exposed shell edge, and provide two distinct shell sections for receiving toppings or other ingredients. A die is utilized to separate the shell sections from each other and form the space therebetween.

21 Claims, 3 Drawing Sheets

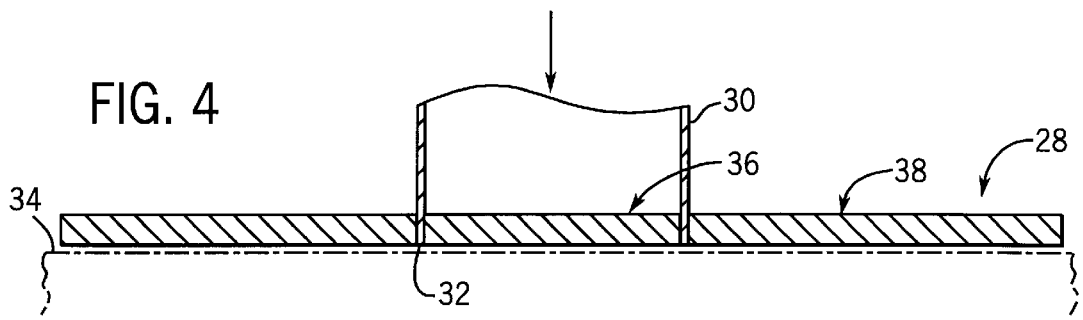
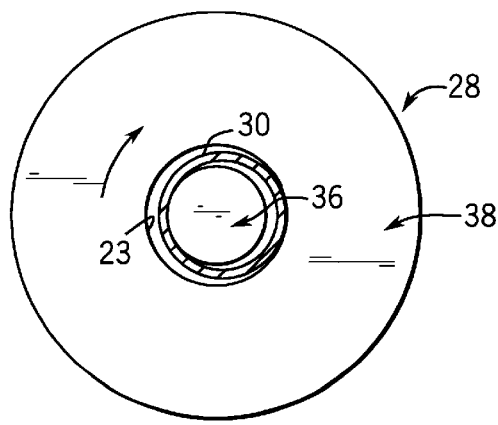
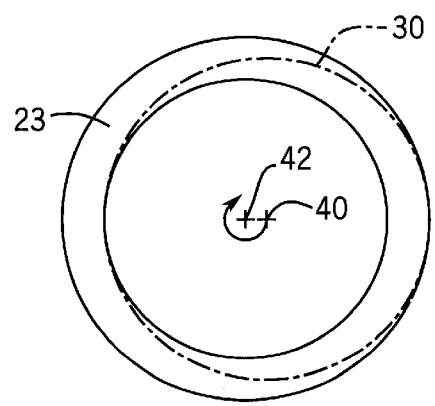
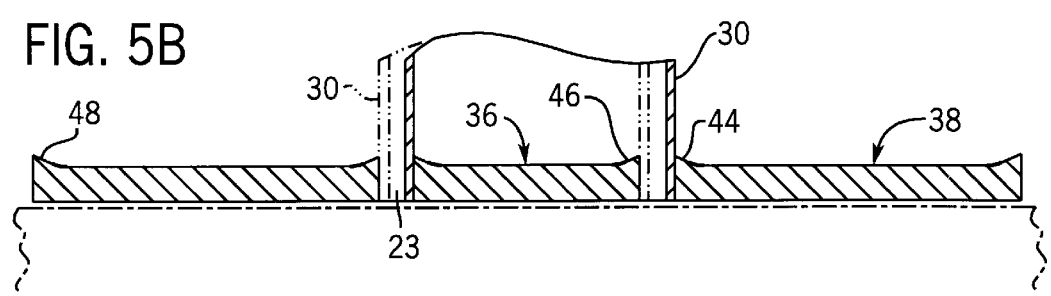
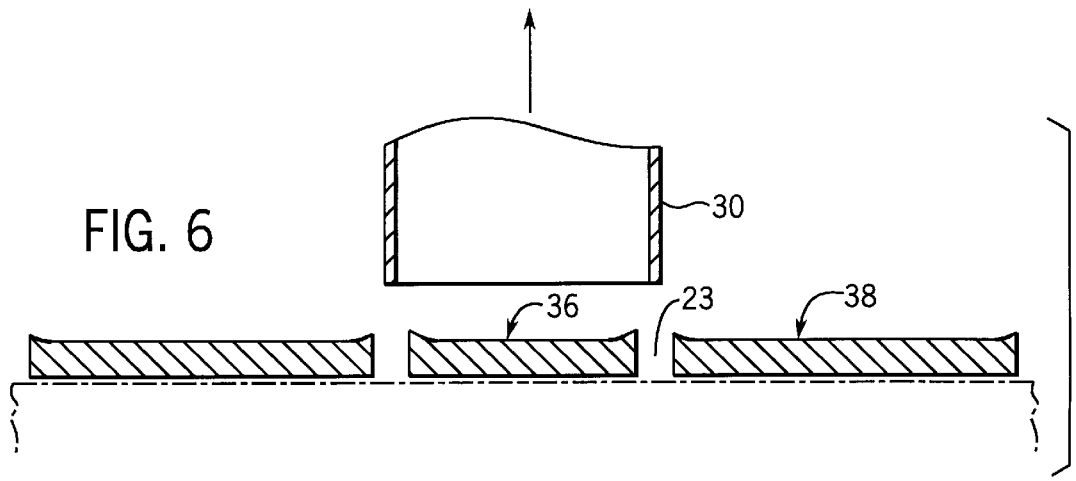

PIZZA-TYPE PRODUCT HAVING AN INCREASED LENGTH OF EXPOSED CRUST EDGE, AND METHOD OF MAKING

BACKGROUND AND SUMMARY OF THE INVENTION

This invention relates to a crust arrangement for a pizza-type product or other such food product having an exposed crust edge.

A pizza-type product typically includes a leavened bread crust having an outer edge and defining an interior. Ingredients such as sauce, cheese and other toppings are placed over the interior of the crust, leaving the outer edge of the crust exposed. The pizza is then baked in an oven to heat the various ingredients and to bake the crust. The crust underlying the ingredients is normally softer than the edge of the crust, due to the crust absorbing a certain amount of moisture from the overlying ingredients, which also function to prevent the upper surface of the crust from being directly exposed to the heat of the oven. After baking, the pizza is cut into pieces for serving.

Some consumers of pizza prefer pieces having an exposed crust edge. The exposed crust edge can make the piece of pizza easier to handle by enabling a person to hold the piece of pizza in an area other than the moist interior crust area. Others prefer "crust pieces" because they like the taste of the crust.

It is an object of the present invention to provide a pizza crust having an increased length of exposed crust edge as compared to the traditional pizza crust, which has an outer crust edge defined by the outer periphery of the crust. It is a further object of the invention to provide a method of increasing the length of the exposed crust edge in a pizza product. A further object of the invention is to provide such a pizza crust and method which is relatively simple to obtain and which provides enhancements in production and marketing of pizza products.

In accordance with the invention, a pizza crust having an outer peripheral edge and an interior is provided with a gap in its interior to define a pair of spaced crust edges, located inwardly of the outer peripheral crust edge. The gap defines spaced interior crust edges, such that an inner portion of the crust includes an outer crust edge and an outer portion of the crust includes a pair of crust edges, one of which is defined by the overall outer edge of the crust and the other of which is defined by the edge of the outer crust portion bordering the gap. In a preferred form, the gap is annular so as to define a peripheral outer crust edge for an inner portion of the crust and a peripheral inner crust edge for an outer portion of the crust, with the peripheral crust edges being spaced from each other. The gap or space may be formed in the crust in any satisfactory manner. For example, the crust may be first cut with a circular cutter, which is then rotated about an eccentric axis such that the action of the cutter functions to create the gap in the crust as the cutter is rotated. This action of the cutter also functions to build up the height of the crust edges, which assists in retaining the sauce and other ingredients in the area of each crust portion inwardly from the crust edges. Alternatively, the gap may be formed by employing a cutter having spaced cutting edges, such that the cutter functions to remove a peripheral ring of crust between the inner and outer portions of the crust.

The invention further contemplates a method of making a pizza crust having an increased exposed edge length and a method of making a two-piece pizza crust, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3b is a side sectional view of the pizza crust and cutter of FIG. 3a;

FIG. 4 is a view similar to FIG. 3b, showing the cutter separating the crust into inner and outer sections;

FIG. 5a is a top plan view similar to FIG. 3a, showing the cutter of FIG. 4 rotated for forming a space between the inner and outer crust sections;

FIG. 5b is a side section view similar to FIG. 3b showing the cutter as positioned and rotated as in FIG. 5a;

FIG. 5c is a top plan view showing eccentric rotation of the cutter as in FIG. 5a;

FIG. 6 is a side section view similar to FIG. 3b and FIG. 4, showing removal of the cutter from the crust;

DETAILED DESCRIPTION OF THE INVENTION

Figure 1:
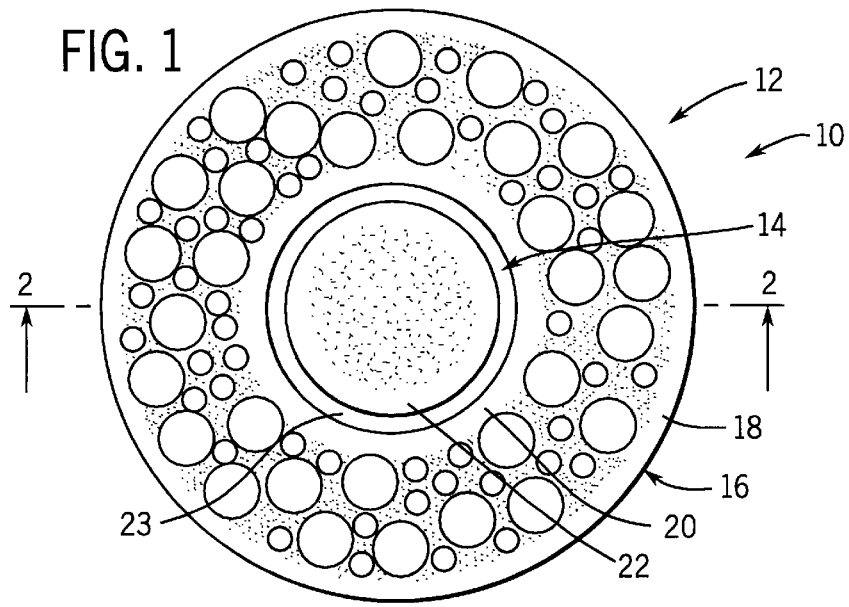
FIG. 1 is a top plan view of a pizza made according to the present invention.
Figure 2:
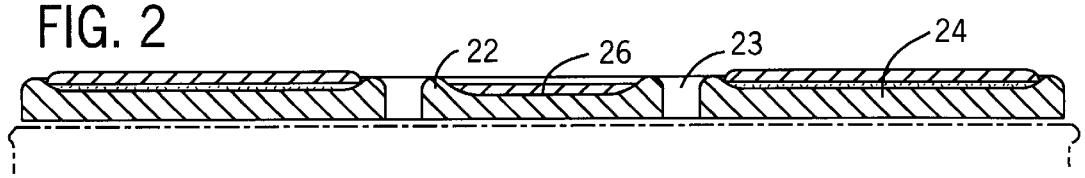
FIG. 2 is a section view taken along line 2—2 of FIG. 1.

FIGS. 1 and 2 illustrate a compound pizza arrangement 10 which generally includes an outer section 12 and an inner section 14. Outer section 12 includes a ring-shaped shell or crust 16 having a raised outer edge 18 and a raised inner edge 20. Inner section 14 defines a raised outer edge 22. A space 23 is defined between outer edge 22 of inner section 14 and inner edge 20 of outer section 12.

Outer and inner edges 18, 20, respectively, of outer section 12 are raised relative to an inner area 24 disposed therebetween. This defines a shallow upwardly facing recess for receiving various pizza ingredients, such as cheese, meat, sauce, vegetables, or any other such ingredients which can be employed in a pizza-type product. Similarly, outer edge 22 of inner section 14 is raised relative to a central portion 26, again defining a shallow upwardly facing recess for receiving various pizza ingredients. In a preferred form, central portion 26 has a thickness less than inner area 24 of outer section 14. As can be appreciated, different ingredients can be used for outer section 12 than are used for inner section 14, to provide variety in the combination of ingredients offered in the compound pizza arrangement 10.

Space 23 is defined between the outwardly facing surface of inner section outer edge 22 and the inwardly facing surface of outer section inner edge 20. Space 23 is sized so as to ensure that edges 20, 22 are maintained apart from each other during baking, when inner section 14 is disposed within the opening defined by outer section 12.

Figure 3A:
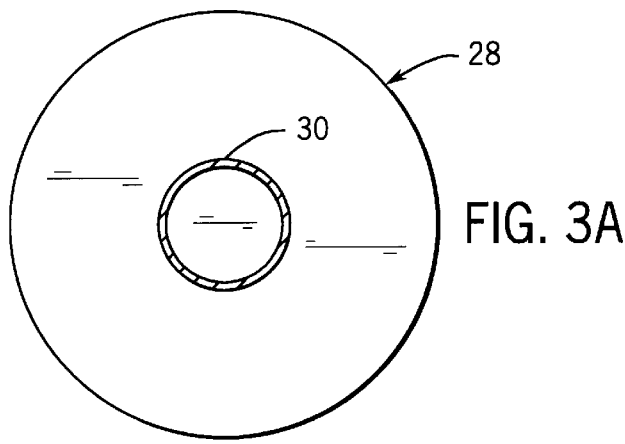
FIG. 3a is a top plan view of a crust for the pizza of FIG. 1, showing a cutter in section for forming inner and outer sections of the crust.
Figure 3B:
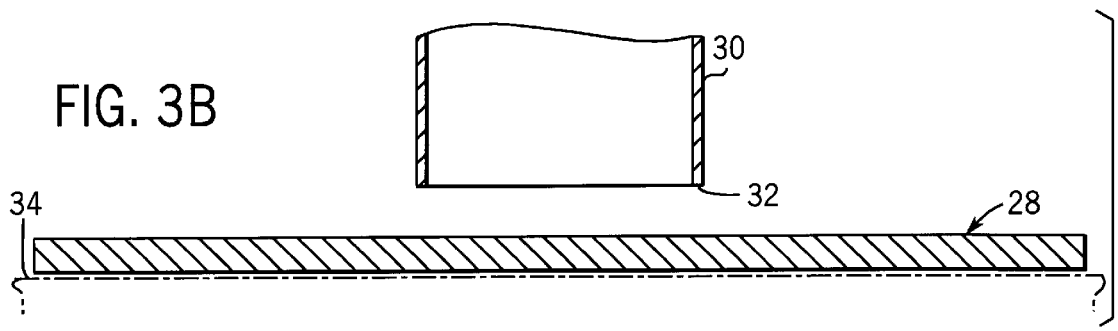

FIG. 3a shows a blank shell 28 for use in forming the compound pizza arrangement 10 illustrated in FIG. 1. Shell blank 28 may be of any satisfactory leavened or unleavened, kneaded dough recipe, formed in any manner to provide a desired shape, which is circular as shown in FIG. 3a. Preferably, the inner, central portion of shell blank 28 has a thickness slightly less than the outer portion thereof.

A circular cutter 30 is employed to separate shell blank 28 into an inner section and an outer section to create a shell as illustrated in FIG. 1. Cutter 30 has a sharpened lower end 32, which is placed over shell blank 28 as it is supported on a surface such as a table 34 or the like. Cutter 30 is lowered toward shell blank 28 as shown in FIG. 4, to separate shell blank 28 into an inner section 36 and an outer section 38. When cutter 30 is employed to initially sever blank 28 into its inner section 36 and its outer section 38, the outer edge of inner section 36 contacts the inner surface of cutter 30 and the inner edge of outer section 38 contacts the outer surface of cutter 30. After initial severing, cutter 30 is rotated about an axis eccentric to its longitudinal axis as illustrated in FIGS. 5a–5c. When cutter 30 is rotated in this manner, space 23 is formed between inner section 36 and outer section 38. That is, as cutter 30 rotates eccentrically about an axis of rotation 40 (FIG. 5c) offset from the longitudinal axis of cutter 30, shown at 42, cutter 30 oscillates in a back and forth manner as shown in FIG. 5b to form space 23 between the inner and outer circumcircles scribed by cutter 30 upon such eccentric rotation.

As shown in FIG. 5b, the eccentric rotation of cutter 30 functions to build up the inner edge of outer shell section 38, as shown at 44, and the outer edge of inner shell section 36, as shown at 46. Built up outer edge 46 of inner shell section 36 forms outer edge 22 of inner section 14 when baked, and likewise built up inner edge 44 of outer shell section 38 forms inner edge 20 of outer section 12 when baked. Shell blank 28 may be provided with an outer raised portion 48 at its outer edge, such that the ring defined by outer shell section 38 forms the raised outer edge 18 for outer pizza section 12 when baked.

Once cutter 30 has been operated to form space 23 between inner shell section 36 and outer shell section 38, cutter 30 is removed as shown in FIG. 6, which leaves inner shell section 36 within an opening formed in outer shell section 38 by operation of cutter 30 as shown and described.

Figure 7:
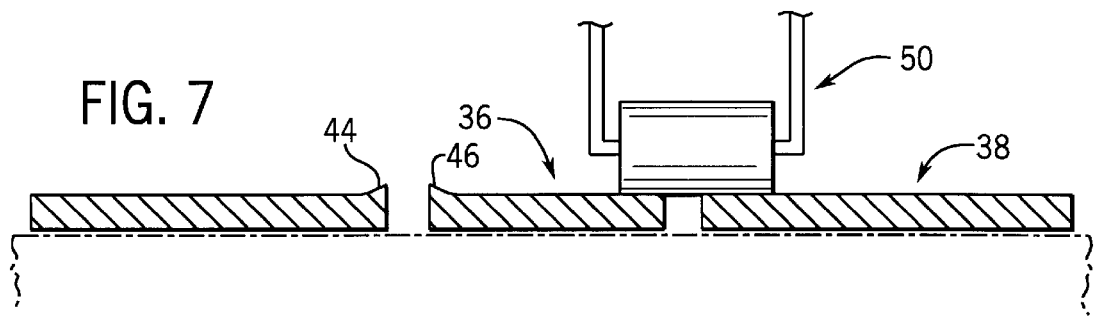
FIG. 7 is a side section view showing a roller for flattening the edges of the inner and outer crust sections formed utilizing the cutter as in FIGS. 3–5.

Alternatively, as shown in FIG. 7, blank 28 may have a flat outer edge, and the raised edges 44, 46 formed by cutter 30 may be flattened utilizing a roller 50, or any other satisfactory manner. With this arrangement, both the inner and outer edges of outer shell section 38 are flat, as is the outer edge of inner shell section 36 while space 23 is maintained between inner and outer shell sections 36, 38, respectively.

Figure 8:
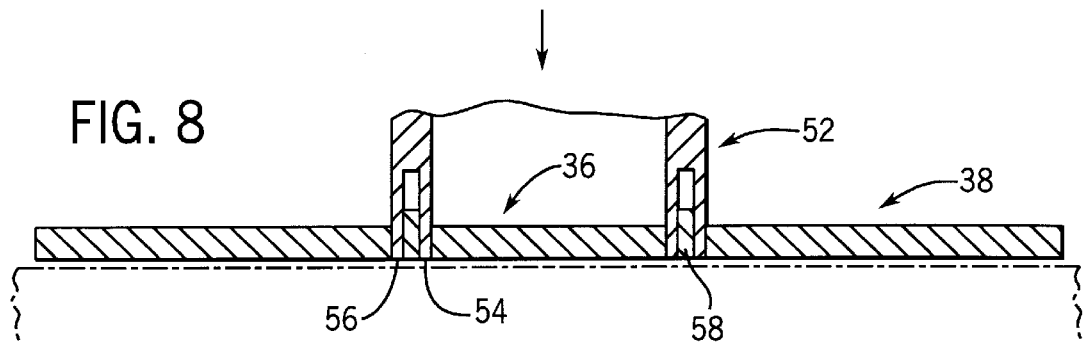
FIG. 8 is a side section view similar to FIG. 5b, showing an alternate cutter construction for separating the inner and outer crust sections.

FIG. 8 illustrates an alternative arrangement for forming space 23 between inner shell section 36 and outer shell section 38. In this arrangement, a cutter 52, having an annular inner cutting edge 54 and a spaced annular outer cutting edge 56, is employed to separate blank 28 into its inner section 36 and its outer section 38. This arrangement is preferably employed when it is desired to provide both inner section 36 and outer section 38 with a flat edge. An excess strip of shell dough 58 is provided between inner and outer cutting edges 54, 56, respectively, which is discarded after cutter 52 is removed in preparation for a subsequent cutting operation.

Figure 9:
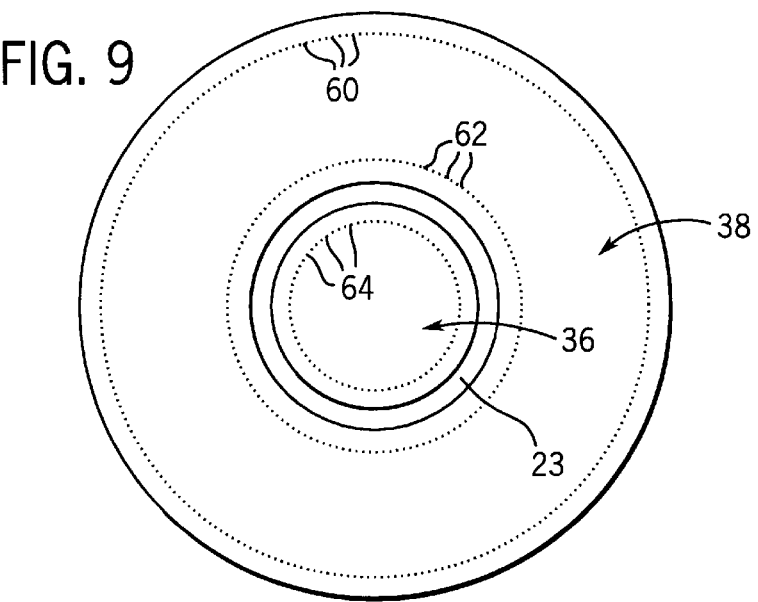
FIG. 9 is a top plan view of the crust separated into inner and outer sections prior to placement of various ingredients on the crust to form the pizza of FIG. 1.

FIG. 9 illustrates use of a series of perforations 60 spaced slightly inwardly from the outer edge of outer shell section 38 and a series of spaced perforations 62 spaced slightly inwardly from the inner edge of outer shell section 38. Similarly, a series of perforations 62 are formed slightly inwardly of the outer edge of shell inner section 36. Perforations 60–64 are formed utilizing a perforating die or in any other satisfactory manner, and define the desired boundary for placement of the various ingredients of pizza 10 on shell sections 36, 38. Perforations 60–64 may be formed after space 23 has been provided between inner and outer shell sections 36, 38, respectively, or may be formed at the time blank 28 is separated into its inner and outer sections 36, 38, respectively utilizing a perforating die in combination with a cutting die such as 30.

As noted previously, the presence of space or gap 23 between inner shell section 36 and outer shell section 38 prevents the shell section edges from contacting each other when the shell expands during baking. The presence of shell edges 20 and 22 in the interior of pizza 10 provides a pizza having an increased amount of exposed shell edge when compared to a conventional pizza which simply includes an outer shell edge such as 18. Similarly, the separation of the shell into distinct sections provides a convenient and simple vehicle for making one section of the pizza different than the other to suit different individual tastes. It is contemplated that the ingredients will be added to the various pizza sections in any satisfactory manner, such as by hand or by use of automated equipment.

The invention contemplates that gap 23 between inner pizza section 14 and outer pizza section 12 will be peripheral and annular, to fully separate inner pizza section 14 from outer pizza section 12. It is also understood, however, that gaps could be formed in any configuration, whether continuous or discontinuous, within the interior of the pizza shell to increase the overall exposed edge area of the shell. In addition, while the invention has been shown and described with respect to a circular or round pizza, it is also contemplated that the invention can be employed in pizza shells having any desired shape. The gap separating the inner pizza section from the outer pizza section may have a shape corresponding to the overall shape of the pizza, or may have a different shape.

Applicant has experimented by forming the shell dough to a circle having a diameter of approximately 13½ inches. A cutter 30 having a 4¾ inch diameter was used to form a gap 23 having a width of ¾ inch, leaving inner shell section 36 with a diameter of 4 inches and outer shell section 38 with a width of 4 inches. While this arrangement was found satisfactory, it is understood that other arrangements and configurations can also be employed.

The invention thus provides a virtually limitless way to configure a pizza having an increased exposed crust edge configuration while providing numerous opportunities for varying the configuration of the pizza and enhancing its marketability and differentiation from other conventional pizza products.

In addition, the invention has been shown and described with respect to production of a pizza product employing a shell and toppings placed thereon. It is contemplated that the invention can be used in any food product production utilizing a flat shell or other base from a dough-type material, and is not limited to production of pizza per se.

Various alternatives and embodiments are contemplated as being within the scope of the following claims particularly pointing out and distinctly claiming the subject matter regarded as the invention.

I claim:

1. A food product, comprising:
   an outer shell defining a peripheral outer edge and a peripheral inner edge, wherein the peripheral inner edge defines an opening;
   an inner shell separate from the outer shell and defining a peripheral outer edge, wherein the outer edge of the inner shell has a shape corresponding to that of the peripheral inner edge defined by the outer shell, and wherein the outer edge of the inner shell is spaced laterally inwardly from the inner edge of the outer shell such that the inner shell is received within the opening of the outer shell and a peripheral space is defined between the outer edge of the inner shell and the inner edge of the outer shell.

2. The food product of claim 1, wherein the outer shell defines a central area between the inner edge and the outer edge, and wherein at least the inner edge of the outer shell is raised relative to the central portion.

3. The food product of claim 2, wherein the inner shell defines a central portion and wherein the outer edge of the inner shell is raised relative to the central portion.

4. The food product of claim 3, wherein the central portion of the inner shell has a thickness less than the central portion of the outer shell.

5. The food product of claim 3, wherein the outer edge of the outer shell is raised relative to the central portion of the outer shell.

6. The food product of claim 3, wherein the outer shell and the inner shell are formed by providing a shell blank.

7. The food product of claim 6, wherein the space is defined by inserting a cutter through the shell blank, wherein the cutter has an annular configuration and extends along a central axis, and rotating the cutter eccentrically about an axis of rotation offset from the central axis of the cutter, wherein the eccentric rotation of the cutter functions to form the space between an outer edge of the inner shell section and an inner edge of the outer shell section.

8. The food product of claim 6, wherein the cutter includes a peripheral inner cutting edge and a peripheral outer cutting edge spaced from the inner cutting edge, wherein a space between the inner and outer cutting edges functions to provide the space disposed between the outer edge of the inner shell section and the inner edge of the outer shell section.

9. A method of making a two-piece pizza shell, comprising the steps of:
   providing a shell blank having a peripheral outer edge and an interior defining a top surface and a bottom surface and a thickness therebetween; and
   forming a transverse opening in the interior of the shell blank, the opening extending throughout the thickness of the shell blank between the top and bottom surfaces of the shell blank, wherein the opening is operable to divide the shell blank into an inner shell portion having an outer peripheral edge and an outer shell portion having an inner peripheral edge spaced laterally outwardly from the outer peripheral edge of the inner shell portion and separated by the transverse opening.

10. A method of making a two-piece pizza shell, comprising the steps of:
    providing a shell blank having a peripheral outer edge and an interior defining a thickness; and
    forming an annular space in the interior of the shell blank throughout the thickness of the shell blank, wherein the annular space is operable to divide the shell blank into an inner shell portion having an outer peripheral edge and an outer shell portion having an inner peripheral edge spaced laterally outwardly from the outer peripheral edge of the inner shell portion, by providing a cutter having a peripheral cutting edge and extending along a longitudinal axis, inserting the cutter through the shell blank to separate the shell blank into its inner and outer shell portions, and rotating the cutter about an axis of rotation offset from the longitudinal axis of the cutter, wherein rotation of the cutter functions to engage the cutter with the edges of the shell portions to move the outer edge of the inner shell portion and the inner edge of the outer shell portion apart from each other.

11. A method of making a two-piece pizza shell, comprising the steps of:
    providing a shell blank having a peripheral outer edge and an interior defining a thickness; and
    forming an annular space in the interior of the shell blank throughout the thickness of the shell blank to divide the shell blank into an inner shell portion having an outer peripheral edge and an outer shell portion having an inner peripheral edge spaced laterally outwardly from the outer peripheral edge of the inner shell portion, by inserting a cutter through the shell blank, wherein the cutter includes an inner peripheral cutting edge defining a first transverse dimension and an outer peripheral cutting edge spaced from the inner peripheral cutting edge and defining a second transverse dimension greater than the first transverse dimension, such that a strip of shell material is cut between the inner and outer cutting edges when inserted through the shell blank, and removing the strip of shell material from between the inner and outer shell portions.

12. A method of increasing the exposed crust length in a pizza including a shell having an interior defining a top surface and a bottom surface and a thickness therebetween, comprising forming a transverse opening in the interior of the shell, the opening extending throughout the thickness of the shell between the top and bottom surfaces of the shell to define an outer shell length for an inner portion of the shell and a separate inner crust length for an outer portion of the shell, wherein the outer crust length and the inner crust length are separate and laterally spaced apart from each other by the opening.

13. The method of claim 12, wherein the step of forming a transverse opening in the interior portion of the shell is carried out such that the transverse opening has an annular configuration to define an inner shell section separate from an outer shell section.

14. The method of claim 13, wherein the step of forming the transverse opening in the interior of the shell is carried out by separating the interior of the shell and creating a spaced, raised shell area defining the outer shell length for the inner shell section and defining the inner shell length for the outer shell section.

15. The method of claim 14, further comprising the step of flattening the raised crust area.

16. In a pizza shell defining an outer peripheral edge and an interior defining a top surface and a bottom surface and a thickness therebetween, the improvement comprising a transverse opening formed in the shell interior, the opening extending throughout the thickness of the shell between the top and bottom surfaces of the shell to define first and second laterally spaced, separate edges, wherein the first edge of the opening forms a first separate crust edge of the shell laterally separated by the opening from a second crust edge of the shell formed by the second edge of the opening, to increase the exposed crust edge length of the shell.

17. The improvement of claim 16, wherein the transverse opening is formed so as to be annular and to separate the shell into an inner section and an outer section, and wherein the transverse opening functions to maintain separation between an outer edge of the inner shell section and an inner edge of the outer shell section.

18. The improvement of claim 17, wherein the transverse opening has a shape corresponding to the overall shape defined by the outer peripheral edge of the shell.

19. The improvement of claim 17, wherein the outer peripheral edge of the shell is raised relative to a central portion of the outer shell section, and wherein the transverse opening is formed such that the inner edge of the outer shell section is also raised relative to the central portion of the outer shell section and such that the outer edge of the inner shell section is raised relative to an inner portion of the inner shell section.

20. The improvement of claim 17 further comprising one or more perforations formed in the shell adjacent one or more of the pair of spaced crust edges to define the outer extent of an internal area of each shell section for receiving ingredients to be placed on the shell sections.

21. A food product, comprising:
  a substantially planar outer shell defining a peripheral outer edge and a peripheral inner edge, wherein the peripheral inner edge defines an opening; and
  a substantially planar inner shell separate from the outer shell and defining a peripheral outer edge, wherein the outer edge of the inner shell is laterally spaced from the inner edge of the outer shell and is sized and configured so as to enable the inner shell to be received within the opening defined by the outer shell, wherein a peripheral space is defined between the outer edge of the inner shell and the inner edge of the outer shell.

* * * * *

UNITED STATES PATENT AND TRADEMARK OFFICE
CERTIFICATE OF CORRECTION

PATENT NO. : 5,962,050
DATED : October 5, 1999
INVENTOR(S) : JOHN D. ADASHEK

It is certified that error appears in the above-indentified patent and that said Letters Patent is hereby corrected as shown below:

In The Claims

Claim 12, col. 6, line 41, delete "shell" (1st occurrence) and substitute therefor -- crust --; Claim 14, col. 6, line 54, delete "shell" and substitute therefor -- crust -- (1st and 2nd occurrences); Claim 14, col. 6, line 55, delete "shell" (2nd occurrence) and substitute therefor -- crust --.

Signed and Sealed this

Eleventh Day of April, 2000

Attest:

Q. TODD DICKINSON

Attesting Officer

Director of Patents and Trademarks